US008912680B2

(12) United States Patent
Gelmini et al.

(10) Patent No.: US 8,912,680 B2
(45) Date of Patent: Dec. 16, 2014

(54) WIND POWER TURBINE ROTARY ELECTRIC MACHINE

(71) Applicant: Wilic S.AR.L., Luxembourg (LU)

(72) Inventors: Emmanuele Gelmini, Trento (IT); Matteo Casazza, Val di Vizze (IT)

(73) Assignee: Wilic S.AR.L., Luxembourg (LU)

( * ) Notice: Subject to any disclaimer, the term of this patent is extended or adjusted under 35 U.S.C. 154(b) by 0 days.

(21) Appl. No.: 13/770,708

(22) Filed: Feb. 19, 2013

(65) Prior Publication Data

US 2013/0214540 A1    Aug. 22, 2013

(30) Foreign Application Priority Data

Feb. 21, 2012    (IT) ............... MI2012A0257

(51) Int. Cl.
| | | |
|---|---|---|
| *F03D 9/00* | (2006.01) | |
| *H02P 9/04* | (2006.01) | |
| *F03D 11/00* | (2006.01) | |
| *H02K 5/173* | (2006.01) | |
| *H02K 7/18* | (2006.01) | |
| *F16C 32/06* | (2006.01) | |
| *H02K 1/00* | (2006.01) | |
| *H02K 15/00* | (2006.01) | |

(52) U.S. Cl.
CPC ............ *F03D 11/00* (2013.01); *H02K 15/0006* (2013.01); *Y02E 10/725* (2013.01); *H02K 2213/06* (2013.01); *H02K 5/1735* (2013.01); *H02K 7/1838* (2013.01); *H02K 2213/12* (2013.01)
USPC ................ 290/55; 290/44; 384/107; 310/191

(58) Field of Classification Search
CPC ... H02K 2213/12; H02K 15/02; H02K 15/16; H02K 15/028; H02K 1/06; H02K 1/182; H02K 1/185; H02K 1/2793; H02K 1/28; H02K 7/08; H02K 7/14; H02K 7/085; H02K 7/086; H02K 7/183; H02K 21/024; H02K 5/1737; Y02E 10/722; Y02E 10/72; Y02E 10/641; F03D 11/00; F03D 11/04; F03D 11/0075; F03D 1/065
USPC ........................ 290/44, 55; 310/191; 384/107
See application file for complete search history.

(56) References Cited

U.S. PATENT DOCUMENTS 4,554,472 A  *  11/1985  Kumatani ................... 310/62
4,562,367 A  *  12/1985  Kumatani ................... 310/62
(Continued)

FOREIGN PATENT DOCUMENTS

| EP | 2339176 A2 | 6/2011 |
| WO | WO2011006810 A2 | 1/2011 |
| WO | WO2011072819 A1 | 6/2011 |

OTHER PUBLICATIONS

Search Report for Italian Application Serial No. MI20120257.

*Primary Examiner* — Pedro J Cuevas
(74) *Attorney, Agent, or Firm* — Neal, Gerber & Eisenberg LLP (57) ABSTRACT

A rotary electric machine for a wind power turbine for generating electric power has a tubular stator having a plurality of stator segments; a tubular rotor which has a plurality of rotor segments, is located inside the tubular stator, and rotates about an axis of rotation with respect to the tubular stator; a sleeve located at least partly inside the tubular rotor and connectable to a supporting frame of the wind power turbine; and a bearing located inside and fixed to the sleeve, and which supports the tubular rotor rotating with respect to the sleeve.

33 Claims, 4 Drawing Sheets

(56) References Cited

U.S. PATENT DOCUMENTS

| | | | |
|---|---|---|---|
| 5,675,203 A * | 10/1997 | Schulze et al. | 310/113 |
| 5,723,928 A * | 3/1998 | Imai et al. | 310/114 |
| 5,894,902 A * | 4/1999 | Cho | 180/65.51 |
| 6,380,653 B1 * | 4/2002 | Seguchi | 310/112 |
| 6,781,276 B1 * | 8/2004 | Stiesdal et al. | 310/254.1 |
| 6,911,741 B2 * | 6/2005 | Pettersen et al. | 290/44 |
| 6,943,478 B2 * | 9/2005 | Zepp et al. | 310/191 |
| 7,042,128 B2 * | 5/2006 | Zepp et al. | 310/191 |
| 7,230,363 B2 * | 6/2007 | Stout et al. | 310/266 |
| 7,385,332 B2 * | 6/2008 | Himmelmann et al. | 310/190 |
| 7,944,076 B2 * | 5/2011 | Stiesdal | 290/55 |
| 7,944,077 B2 * | 5/2011 | Fischer et al. | 290/55 |
| 7,956,484 B2 * | 6/2011 | Stiesdal | 290/55 |
| 7,956,504 B2 * | 6/2011 | Quere | 310/114 |
| 7,990,006 B2 * | 8/2011 | Stiesdal | 310/90 |
| 8,008,798 B2 * | 8/2011 | Jansen et al. | 290/55 |
| 8,084,879 B2 * | 12/2011 | Stiesdal | 290/55 |
| 8,089,175 B2 * | 1/2012 | Stiesdal | 290/55 |
| 8,120,198 B2 * | 2/2012 | Pabst et al. | 290/55 |
| 8,154,146 B2 * | 4/2012 | Fischer et al. | 290/55 |
| 8,167,495 B2 * | 5/2012 | Stiesdal | 384/107 |
| 8,183,802 B2 * | 5/2012 | Quere | 318/269 |
| 8,222,792 B2 * | 7/2012 | Platon et al. | 310/266 |
| 8,264,097 B2 * | 9/2012 | Numajiri | 290/55 |
| 8,358,028 B2 * | 1/2013 | Stiesdal | 290/55 |
| 8,358,189 B2 * | 1/2013 | Kaessner et al. | 335/284 |
| 8,376,708 B2 * | 2/2013 | Patel et al. | 416/169 R |
| 8,426,995 B2 * | 4/2013 | Langel | 290/44 |
| 8,454,309 B2 * | 6/2013 | Bevington et al. | 415/229 |
| 8,536,753 B2 * | 9/2013 | Stiesdal | 310/193 |
| 8,558,426 B2 * | 10/2013 | Stiesdal | 310/156.38 |
| 8,598,732 B2 * | 12/2013 | Stiesdal | 290/55 |
| 8,669,672 B2 * | 3/2014 | Stiesdal | 290/55 |
| 8,791,617 B2 * | 7/2014 | Stiesdal | 310/193 |
| 2006/0152014 A1 * | 7/2006 | Grant et al. | 290/55 |
| 2007/0278979 A1 * | 12/2007 | Hashimoto et al. | 318/538 |
| 2008/0199309 A1 * | 8/2008 | Bagepalli et al. | 415/170.1 |
| 2008/0309086 A1 * | 12/2008 | Takaichi et al. | 290/52 |
| 2009/0134627 A1 * | 5/2009 | Stiesdal | 290/55 |
| 2009/0134628 A1 * | 5/2009 | Stiesdal | 290/55 |
| 2009/0232429 A1 * | 9/2009 | Stiesdal | 384/107 |
| 2009/0256442 A1 * | 10/2009 | Stiesdal | 310/90 |
| 2010/0066096 A1 * | 3/2010 | Stiesdal | 290/55 |
| 2010/0127503 A1 * | 5/2010 | Fischer et al. | 290/55 |
| 2010/0253087 A1 * | 10/2010 | Lauke | 290/55 |
| 2010/0329867 A1 * | 12/2010 | Patel et al. | 416/169 R |
| 2011/0062719 A1 * | 3/2011 | Stiesdal | 290/55 |
| 2011/0109099 A1 * | 5/2011 | Stiesdal | 290/55 |
| 2011/0115234 A1 * | 5/2011 | Stiesdal | 290/55 |
| 2011/0133469 A1 * | 6/2011 | Jansen et al. | 290/55 |
| 2011/0133479 A1 * | 6/2011 | Stiesdal | 290/55 |
| 2011/0133586 A1 * | 6/2011 | Stiesdal | 310/90 |
| 2011/0148119 A1 * | 6/2011 | Fischer et al. | 290/55 |
| 2012/0032546 A1 * | 2/2012 | Numajiri | 310/156.12 |
| 2012/0098268 A1 * | 4/2012 | Gelmini | 290/55 |
| 2012/0112463 A1 * | 5/2012 | Gelmini | 290/55 |
| 2012/0133142 A1 * | 5/2012 | Langel | 290/55 |
| 2012/0169062 A1 * | 7/2012 | Numajiri | 290/55 |
| 2012/0248781 A1 * | 10/2012 | Casazza et al. | 290/55 |
| 2013/0221677 A1 * | 8/2013 | Hinken | 290/55 |
| 2013/0270837 A1 * | 10/2013 | Mongeau et al. | 290/1 C |
| 2013/0285501 A1 * | 10/2013 | Staghoj et al. | 310/198 |
| 2013/0300124 A1 * | 11/2013 | Chobot et al. | 290/55 |
| 2013/0300125 A1 * | 11/2013 | Ruschoff et al. | 290/55 |
| 2013/0302144 A1 * | 11/2013 | Demtroder et al. | 415/124.2 |
| 2013/0320682 A1 * | 12/2013 | Stiesdal | 290/55 |
| 2013/0320794 A1 * | 12/2013 | Stiesdal | 310/90 |
| 2014/0028138 A1 * | 1/2014 | Feher et al. | 310/156.08 |
| 2014/0062231 A1 * | 3/2014 | Casazza et al. | 310/59 |
| 2014/0084725 A1 * | 3/2014 | Stanke | 310/91 |

* cited by examiner

WIND POWER TURBINE ROTARY ELECTRIC MACHINE

PRIORITY CLAIM

This application claims the benefit of and priority to Italian Patent Application No. MI2012A 000257, filed on Feb. 21, 2012, the entire contents of which are incorporated by reference herein.

BACKGROUND

Unlike certain rotary electric machines, rotary electric machines used in wind power turbines, particularly large wind power turbines, must have certain characteristics, such as relatively light weight, easy access for maintenance, and easy component part assembly, disassembly and transport, both at the first-assembly stage and when changing parts or making repairs. In addition, they must be connectable easily to the supporting frame and the blade assembly, and must be so designed as not to require excessively bulky, heavy supporting frames.

The tendency in the wind power turbine industry is towards increasingly high-power rotary electric machines, which makes it difficult to satisfy conflicting market demands.

SUMMARY

The present disclosure relates to a wind power turbine rotary electric machine.

The present disclosure provides a rotary electric machine, which provides for relatively easy worker access and relatively easy component part assembly and disassembly.

According to one embodiment of the present disclosure, there is provided a rotary electric machine for a wind power turbine for generating electric power, the rotary electric machine including a tubular stator including a plurality of stator segments; a tubular rotor which includes a plurality of rotor segments, is located inside the tubular stator, and rotates about an axis of rotation with respect to the tubular stator; a sleeve located at least partly inside the tubular rotor and connectable to a supporting frame of the wind power turbine; and a bearing located inside and fixed to the sleeve, and which supports the tubular rotor rotating with respect to the sleeve.

The present disclosure makes it possible to achieve a rotary electric machine with a relatively lightweight structure, and which permits easy access for maintenance, easy removal of the stator and rotor segments, and relatively easy replacement of the bearing.

In one embodiment of the present disclosure, the sleeve includes a first end ring designed or configured for connection to the supporting frame of the wind power turbine; a second end ring smaller than the first end ring and designed or configured to house the bearing; and a connecting portion connecting the first and second end ring.

The bearing can thus be transferred inside the supporting frame relatively easily through the first end ring.

In one embodiment of the present disclosure, the connecting portion includes a plurality of arms between the first and second end ring.

The sleeve serves to support the annular stator and rotor, and to connect the rotary electric machine to the supporting frame using the first and second end ring. The connecting arms between the first and second end ring allow or enable access to parts of the rotary electric machine, allow or enable air to circulate, and keep down the weight of the rotary electric machine.

In one embodiment, the sleeve is cast in one piece.

In one embodiment of the present disclosure, the sleeve includes a first coupling portion along the first end ring, for connecting the sleeve to the supporting frame of the wind power turbine.

Connecting the smaller-diameter structural member (i.e., the sleeve) to the supporting structure has the advantage of reducing the size and weight of the supporting structure and so reducing the weight of the wind power turbine as a whole.

In one embodiment of the present disclosure, the sleeve includes a second coupling portion along the first end ring, for centring and connecting the tubular stator to the sleeve.

The first end ring thus provides for connecting the sleeve to both the supporting structure and the tubular stator.

In one embodiment, the second coupling portion has a cylindrical face and an annular abutting face.

The sleeve and the tubular stator can thus be connected by a cylindrical coupling.

In one embodiment of the present disclosure, the tubular stator is fitted to and projects from the sleeve, and includes a tubular stator member designed or configured to support the plurality of stator segments along its inner face; and a plurality of further arms arranged about the first end ring to connect one end of the tubular stator member to the sleeve.

The tubular-stator structure is relatively simple, and the further arms avoid increasing the weight of the rotary electric machine.

More specifically, each two adjacent arms in the plurality of arms are spaced apart to define an opening by which to extract and insert the stator segments or rotor segments.

The stator segments can thus be extracted easily through the openings between the arms.

In one embodiment of the present disclosure, the tubular rotor includes a tubular rotor member for supporting the plurality of rotor segments along its outer surface; and a flange located inside the tubular rotor member and connected to the inner race of the bearing.

The tubular-rotor structure is also relatively simple and lightweight.

In one embodiment, the tubular rotor and the sleeve are configured to connect and lock to each other.

The tubular rotor can thus be supported directly by the sleeve when changing the bearing.

In one embodiment of the present disclosure, the sleeve and the tubular rotor are connectable by an actuating device designed or configured to rotate the tubular rotor about the axis of rotation with respect to the sleeve.

When changing rotor segments, the rotor segment can thus be positioned for relatively easy extraction, especially when the rotor segment being changed is aligned with a further arm, or to extract the rotor segment in a given or designated position about the axis of rotation.

In one embodiment of the present disclosure, the tubular stator is selectively rotatable with respect to the sleeve.

This feature of the tubular stator allows or enables each stator segment to be positioned for relatively easy extraction/insertion from/into the tubular stator.

In one embodiment of the present disclosure, the tubular stator and the tubular rotor are configured to connect and lock to each other.

Rotation of the tubular rotor therefore simultaneously rotates the tubular stator about the sleeve. This is also made possible by the tubular stator and the sleeve being connected cylindrically.

Additional features and advantages are described in, and will be apparent from, the following Detailed Description and the figures.

BRIEF DESCRIPTION OF THE DRAWINGS

A non-limiting embodiment of the present disclosure will be described by way of example with reference to the attached drawings, in which.

DETAILED DESCRIPTION

Figure 1:
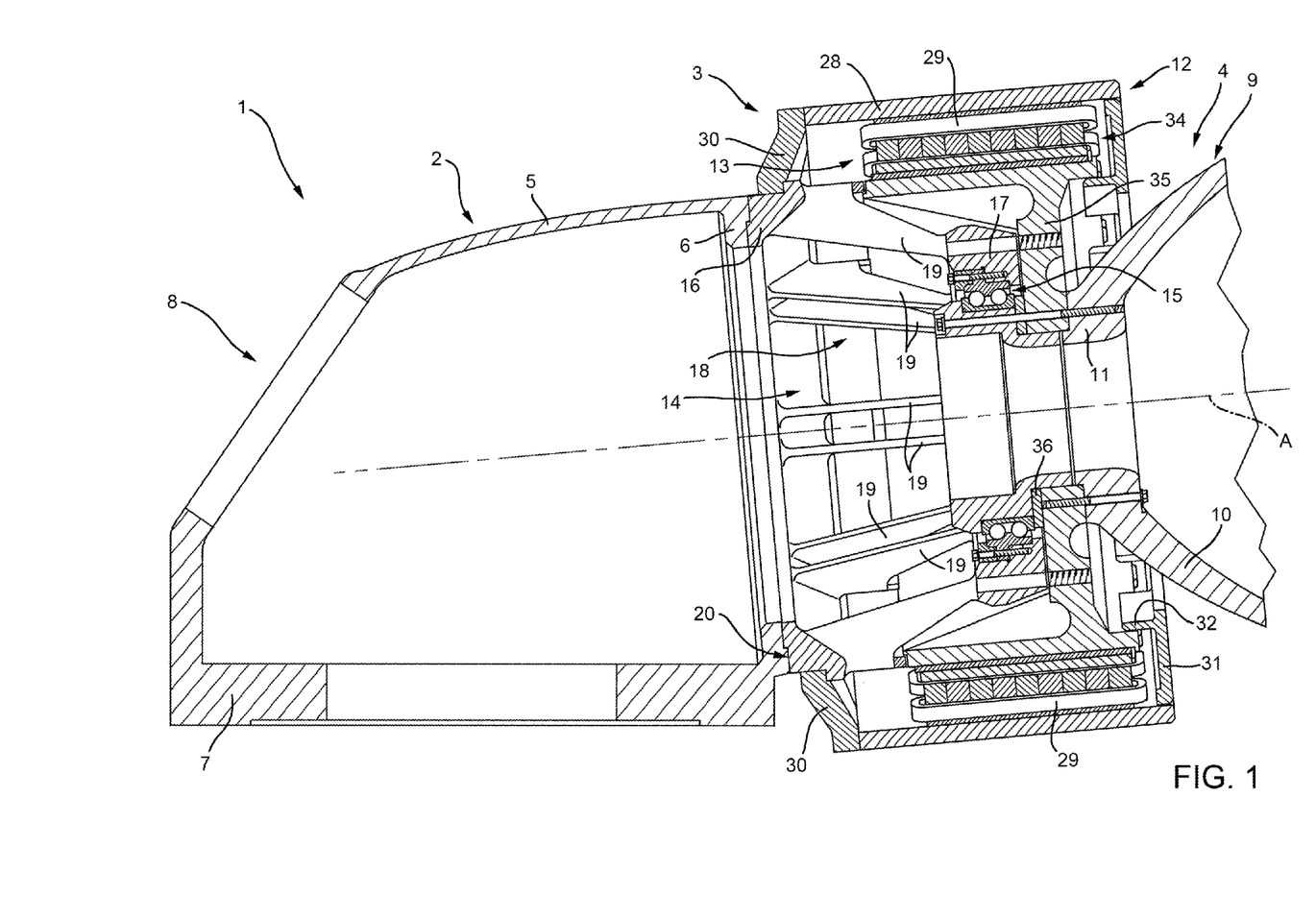
FIG. 1 shows a side section, with parts removed for clarity, of a wind power turbine including a rotary electric machine in accordance with the present disclosure.

Referring now to the example embodiments of the present disclosure illustrated in FIGS. 1 to 5, number 1 in FIG. 1 indicates as a whole a wind power turbine for generating electric power. Wind power turbine 1 is a direct-drive type. In the example shown, wind power turbine 1 includes a supporting frame 2; a rotary electric machine 3; and a blade assembly 4 which rotates about an axis of rotation A. Rotary electric machine 3 is located between supporting frame 2 and blade assembly 4.

In the example shown, supporting frame 2 is defined by a curved, tubular nacelle 5 includes a circular end flange 6 for connection to rotary electric machine 3; an end flange 7 designed or configured to house a pivot (not shown) for connection to a vertical support (not shown); and an opening 8 formed in the wall of nacelle 5 and through which to insert/extract bulky component parts into/from nacelle 5. In one embodiment, opening 8 is substantially aligned with end flange 6.

Blade assembly 4 includes a hub 9 connected to rotary electric machine 3; and a plurality of blades (not shown in the drawings). Hub 9 includes a hollow member 10 for supporting the blades (not shown); and a flange 11 connected to rotary electric machine 3. In particular the flange 11 is directly connected to rotary electric machine 3.

Rotary electric machine 3 extends about axis of rotation A and is substantially tubular, so as to form a passage between hollow supporting frame 2 and hollow hub 9.

Rotary electric machine 3 according to the present disclosure includes a tubular stator 12; and a tubular rotor 13, which is located inside tubular stator 12 and rotates with respect to tubular stator 12 about axis of rotation A. Rotary electric machine 3 includes a sleeve 14 for supporting tubular stator 12 and tubular rotor 13 at respective opposite ends. Sleeve 14 is located partly inside tubular rotor 13. Rotary electric machine 3 includes a bearing 15 which is located inside, and fixed to, sleeve 14, and supports tubular rotor 13 rotating with respect to sleeve 14. In one such embodiment, rotary electric machine 3 includes one bearing for supporting radial and axial loads.

Sleeve 14 is arranged between the supporting frame 2 and the rotating assembly 4.

Sleeve 14 is the frame of the electric machine 3 and has the function of transferring the loads of the blade assembly 4 and tubular stator 12 and tubular rotor 13 to the supporting frame 2.

Sleeve 14 includes an end ring 16 designed or configured for connection to supporting frame 2; an end ring 17 smaller than end ring 16 and designed or configured to house bearing 15; and a connecting portion 18 between end rings 16 and 17. Sleeve 14 as a whole is truncated-cone-shaped.

The space inside the connecting portion 18 is free to such an extent to allow or enable extraction and removal of bearing 15 through the connection portion 18 and the supporting frame 2.

In one embodiment, connecting portion 18 includes a plurality of arms 19 connecting end rings 16 and 17. Arms 19 are equally spaced about axis of rotation A.

Sleeve 14 is formed, in one embodiment cast, in one piece. In the example shown, sleeve 14 has coupling portions for connection to other component parts: one for connection to supporting frame 2, one for connection to tubular stator 12, and one for connection to bearing 15. In one embodiment, the coupling portions require finishing work (e.g., machining) and are formed at end rings 16 and 17.

More specifically, the coupling portion connecting sleeve 14 to supporting frame 2 is formed along end ring 16 and designed or configured to centre and connect sleeve 14 to supporting frame 2—in the example shown, to flange 6, which has a coupling portion complementary to that of sleeve 14. In the example shown, the coupling portion has an abutting face 20. Supporting frame 2 and rotary electric machine 3—more specifically, flange 6 and end ring 16—are connected by a bolted joint.

Figure 3:
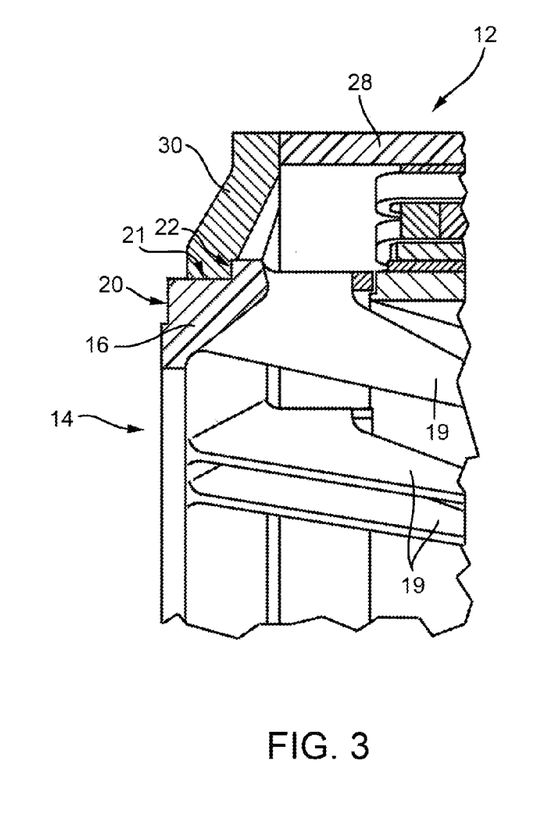
FIG. 3 shows a larger-scale section, with parts removed for clarity, of a detail of the rotary electric machine in FIGS. 1 and 2.

With reference to FIG. 3, the coupling portion connecting sleeve 14 to tubular stator 12 is formed along end ring 16—more specifically, on the outside of end ring 16—and is designed or configured to centre and connect tubular stator 12 to sleeve 14. In the example shown, the coupling portion has a cylindrical centring face 21, and an abutting face 22 perpendicular to cylindrical face 21. Sleeve 14 and tubular stator 12 are connected by bolted joints.

In other words, end ring 16 is connected directly to supporting frame 2 and tubular stator 12.

Figure 4:
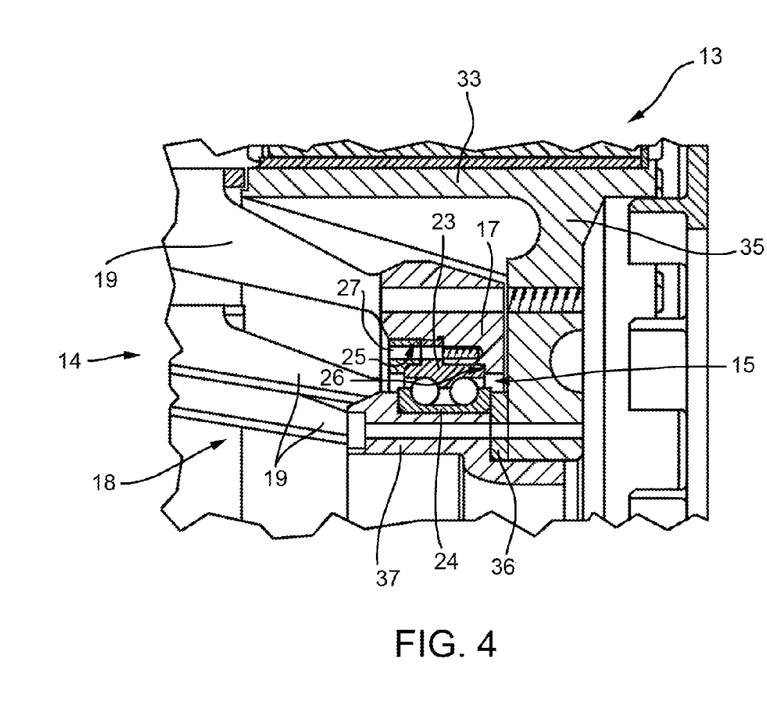
FIG. 4 shows a larger-scale section, with parts removed for clarity, of a further detail of the rotary electric machine in FIGS. 1 and 2.

With reference to FIG. 4, the coupling portion connecting sleeve 14 to bearing 15 extends along end ring 17. Bearing 15 includes an outer race 23 and an inner race 24, and is housed inside end ring 17. More specifically, outer race 23 is housed inside end ring 17, and inner race 24 is connected to tubular rotor 13. Where it connects to bearing 15, end ring 17 has a cylindrical face 25 for centring bearing 15; and an abutting face 26. In other words, outer race 23 of bearing 15 is housed inside an angular seat formed by cylindrical face 25 and abutting face 26, and is locked in position by a lock ring 27 fixed to end ring 17 and to outer race 23 by a bolted joint.

In other words, end ring 17 supports the rotating tubular rotor 13.

With reference to FIG. 1, tubular stator 12 is fitted to and projects from sleeve 14, and includes a tubular stator member 28 designed or configured to support a plurality of stator segments 29 along its inner face; and a plurality of arms 30 arranged about end ring 16 and connecting one end of tubular stator member 28 to sleeve 14. Each arm 30 is connected to tubular stator member 28 by a bolted joint, and is connected to sleeve 14—more specifically to end ring 16—by a bolted joint.

Stator segments 29—in the example shown, coils wound about respective cores—are modular members, which extend mainly in a direction parallel to axis of rotation A, and are equally spaced about axis of rotation A.

Figure 2:
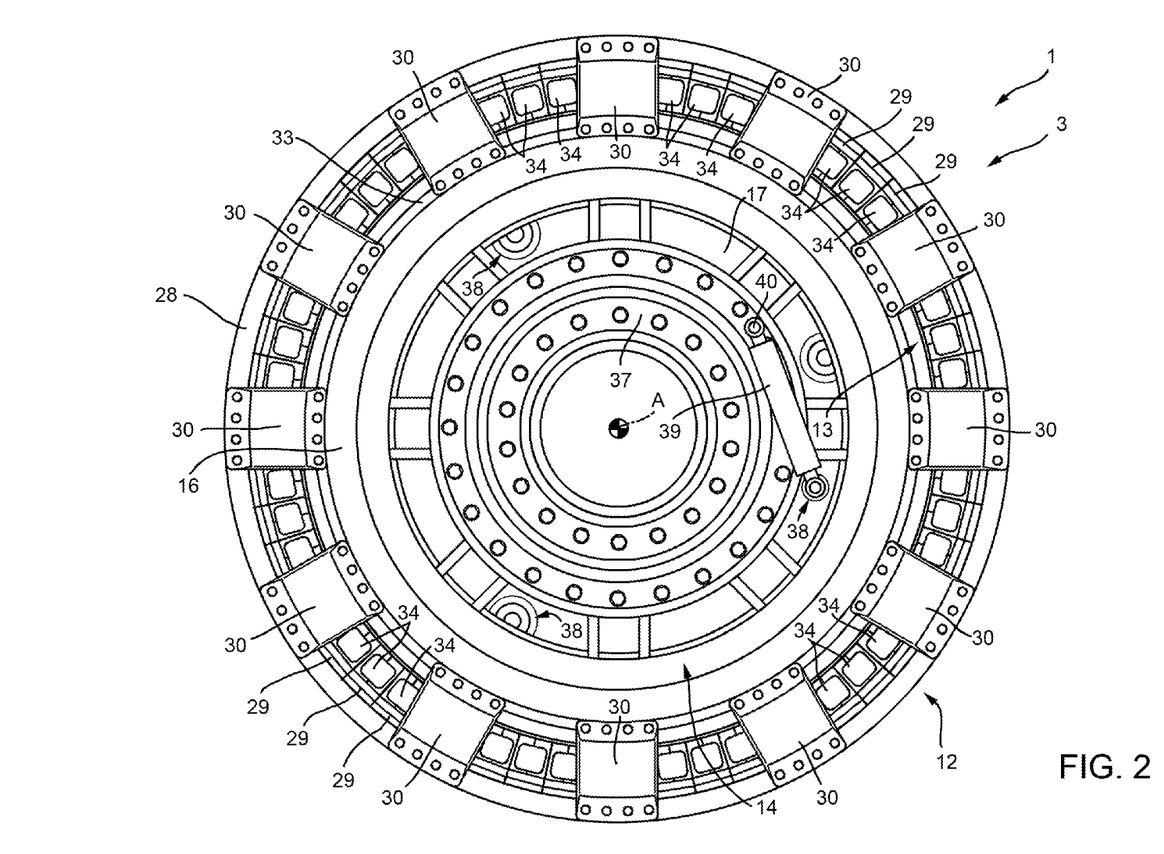
FIG. 2 shows a front view, with parts removed for clarity, of the FIG. 1 wind power turbine.

With reference to FIG. 2, each two adjacent arms 30 in the plurality of arms 30 are spaced apart, so as to form an opening through which to extract or insert a stator segment 29.

Tubular stator 12 also includes an annular wall 31, which is perpendicular to tubular stator member 28, on the hub 9 side, and is designed or configured to support an emergency sliding bearing 32 designed or configured to cooperate with tubular rotor 13.

Tubular rotor 13 includes a tubular rotor member 33; a plurality of rotor segments 34 arranged along the outer surface of tubular rotor member 33; and a flange 35 located inside tubular rotor member 33 and connected to bearing 15, more specifically to inner race 24 of bearing 15. In other words, flange 35 is fixed to bearing 15 on one side, and to hub 9 on the opposite side. Therefore, the rotor 13 is attached to hub 9 and the rotor 13 is configured to be directly attached to hub 9.

With reference to FIG. 4, flange 35 is fixed to bearing 15 and to hub 9 by two joints releasable independently of each other.

Flange 35 is also connectable to sleeve 14—in the example shown, to end ring 17—by a joint, in particular a bolted joint. Flange 35 is located close to one face of end ring 17, and both flange 35 and end ring 17 are designed or configured for connection by a bolted joint, which is used when changing bearing 15, and therefore to connect tubular rotor 13 to sleeve 14.

The connection between sleeve 14 and tubular rotor 13 is used for locking the rotation of the blade assembly 4 (FIG. 1) when the wind turbine 1 (FIG. 1) in the parking configuration and/or for replacement of the rotor and stator segments 34, 29 and/or the bearing 15.

Rotor segments 34—in the example shown, permanent magnets mounted on respective supports—are modular members, which extend mainly in a direction parallel to axis of rotation A, and are equally spaced about axis of rotation A.

With reference to FIG. 2, the opening defined by each two adjacent arms 30 permits extraction or insertion of a rotor segment 34.

With reference to FIG. 4, inner race 24 of bearing 15 is gripped between two lock rings 36 and 37, which in turn are fixed to flange 35.

With reference to FIG. 1, sleeve 14 has an emergency bearing located along arms 30 and designed or configured to contact tubular rotor 13.

With reference to FIG. 2, along some of arms 30, sleeve 14 has connecting points 38 for connecting sleeve 14 to one end of a linear actuator 39, the opposite end of which connects to tubular rotor 13. In the example shown, as opposed to being connected directly to tubular rotor 13, linear actuator 39 is connected to a connecting point 40 on lock ring 36 of inner race 24 of bearing 15. Linear actuator 39 is connected between a connecting point 38 and connecting point 40, so that it is positioned other than radially with respect to axis of rotation A. So, extending or retracting linear actuator 39 moves tubular rotor 13 angularly with respect to sleeve 14.

This maneuver is particularly useful to position a rotor segment 34 at an opening bounded by two adjacent arms 30. Moreover, in one embodiment, stator segments 29 and rotor segments 34 are extracted and inserted at an area of rotary electric machine 3 in the twelve o'clock position.

For this purpose, too, tubular stator 12 can be rotated with respect to sleeve 14. More specifically, to rotate tubular stator 12, the bolted joint between tubular stator 12 and sleeve 14—more specifically, between arms 30 and end ring 16—is released, and the bolted joint between arms 30 and tubular stator member 28 is loosened. Tubular stator 12 and tubular rotor 13 are designed or configured for connection to each other, so that rotation of tubular rotor 13 by linear actuator 39 simultaneously rotates tubular stator 12 to position the stator segment 29 being changed between two arms 30 in the twelve o'clock position.

Figure 5:
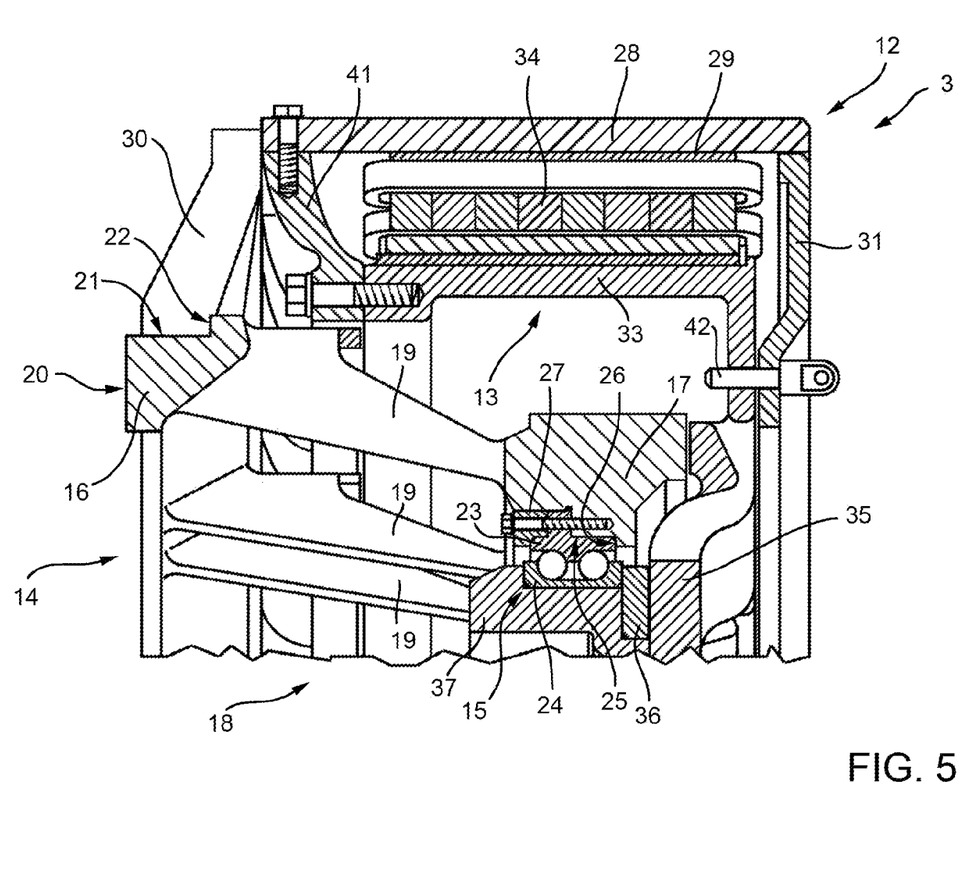
FIG. 5 shows a section, with parts removed for clarity, of a variation of the rotary electric machine in FIGS. 1 to 4.

In the FIG. 5 variation, tubular rotor 13 and tubular stator 12 are connected on both the hub 9 side and the supporting frame 2 side. On the supporting frame 2 side, tubular stator 12 and tubular rotor 13 are connected by a plurality of spacers 41 arranged about axis of rotation A, and by bolted joints; and, on the hub 9 side, they are connected by pins 42, which engage holes in flange 35 and annular wall 31.

Prior to connecting tubular stator 12 and tubular rotor 13, in one embodiments, sheets of nonmagnetic material (not shown in the drawings) are placed between stator segments 29 and rotor segments 34 to prevent them from contacting.

Clearly, changes may be made to the rotary electric machine as described herein without, however, departing from the scope of the accompanying Claims and without diminishing its intended advantages. It is therefore intended that such changes and modifications be covered by the appended claims.

The invention is claimed as follows:

1. An electric power generating wind power turbine rotary electric machine comprising:
   a tubular stator including a plurality of stator segments;
   a tubular rotor including a plurality of rotor segments, said tubular rotor being located inside the tubular stator and configured to rotate about an axis of rotation with respect to the tubular stator;
   a sleeve located at least partly inside the tubular rotor and connectable to a supporting frame of a direct-drive wind power turbine; and
   a single bearing located inside and fixed to the sleeve, and which supports a rotation of the tubular rotor with respect to the sleeve.

2. The electric power generating wind power turbine rotary electric machine of claim 1, wherein the sleeve includes:
   a first end ring configured to connect to the supporting frame of the direct-drive wind power turbine;
   a second end ring smaller than the first end ring and configured to house the single bearing; and
   a connecting portion connecting the first end ring and the second end ring.

3. The electric power generating wind power turbine rotary electric machine of claim 2, wherein the sleeve includes a coupling portion along the first end ring, said coupling portion configured to connect the sleeve to the supporting frame of the direct-drive wind power turbine.

4. The electric power generating wind power turbine rotary electric machine of claim 2, wherein the sleeve includes a coupling portion along the first end ring, said coupling portion configured to center and connect the tubular stator to the sleeve.

5. The electric power generating wind power turbine rotary electric machine of claim 4, wherein the coupling portion has a cylindrical face and an annular abutting face.

6. The electric power generating wind power turbine rotary electric machine of claim 2, wherein the tubular rotor includes:
   a tubular rotor member configured to support the plurality of rotor segments along an outer surface, and
   a flange located inside the tubular rotor member and connected to an inner race of the single bearing.

7. The electric power generating wind power turbine rotary electric machine of claim 1, wherein the tubular rotor and the sleeve are configured to connect and lock to each other.

8. The electric power generating wind power turbine rotary electric machine of claim 1, wherein the tubular stator and the sleeve are connectable to enable the tubular stator to rotate about the axis of rotation with respect to the sleeve.

9. The electric power generating wind power turbine rotary electric machine of claim 1, wherein the tubular stator and the tubular rotor are configured to connect and lock to each other.

10. An electric power generating wind power turbine rotary electric machine sleeve comprising:
    a first end ring configured to connect to a supporting frame of a direct-drive wind power turbine having: (a) a tubular stator including a plurality of stator segments, and (b) a tubular rotor including a plurality of rotor segments, said tubular rotor being located inside the tubular stator and configured to rotate about an axis of rotation with respect to the tubular stator;
    a second end ring smaller than the first end ring and configured to house a single bearing of the direct-drive wind power turbine; and
    a connecting portion connecting the first end ring and the second end ring.

11. The electric power generating wind power turbine rotary electric machine sleeve of claim 10, which includes a coupling portion along the first end ring, said coupling portion configured to connect the sleeve to the supporting frame of the direct-drive wind power turbine.

12. The electric power generating wind power turbine rotary electric machine sleeve of claim 10, which includes a coupling portion along the first end ring, said coupling portion configured to center and connect the tubular stator to the sleeve.

13. The electric power generating wind power turbine rotary electric machine sleeve of claim 12, wherein the coupling portion has a cylindrical face and an annular abutting face.

14. An electric energy producing direct-drive wind power turbine comprising:
    a nacelle and configured to rotate about a first axis;
    a blade assembly configured to rotate with respect to the nacelle about a second axis; and
    a rotary electric machine fitted to the nacelle and configured to produce electric energy, said rotary electric machine including:
        a tubular stator including a plurality of stator segments;
        a tubular rotor including a plurality of rotor segments, said tubular rotor being located inside the tubular stator and configured to rotate about the second axis with respect to the tubular stator;
        a sleeve located at least partly inside the tubular rotor and connectable to the nacelle; and
        a single bearing located inside and fixed to the sleeve, and which supports a rotation of the tubular rotor with respect to the sleeve.

15. The electric energy producing direct-drive wind power turbine of claim 14, wherein the sleeve includes:
    a first end ring configured to connect to the nacelle;
    a second end ring smaller than the first end ring and configured to house the single bearing; and
    a connecting portion connecting the first end ring and the second end ring.

16. The electric energy producing direct-drive wind power turbine of claim 15, wherein the sleeve includes a coupling portion along the first end ring, said coupling portion configured to connect the sleeve to the nacelle.

17. The electric energy producing direct-drive wind power turbine of claim 15, wherein the sleeve includes a coupling portion along the first end ring, said coupling portion configured to center and connect the tubular stator to the sleeve.

18. The electric energy producing direct-drive wind power turbine of claim 15, wherein the tubular rotor includes:
    a tubular rotor member configured to support the plurality of rotor segments along an outer surface, and
    a flange located inside the tubular rotor member and connected to an inner race of the single bearing.

19. The electric energy producing direct-drive wind power turbine of claim 14, wherein the tubular rotor and the sleeve are configured to connect and lock to each other.

20. The electric energy producing direct-drive wind power turbine of claim 14, wherein the tubular stator and the sleeve are connectable to enable the tubular stator to rotate about the second axis with respect to the sleeve.

21. The electric energy producing direct-drive wind power turbine of claim 14, wherein the tubular stator and the tubular rotor are configured to connect and lock to each other.

22. An electric power generating wind power turbine rotary electric machine comprising:
    a tubular stator including a plurality of stator segments;
    a tubular rotor including a plurality of rotor segments, said tubular rotor being located inside the tubular stator and configured to rotate about an axis of rotation with respect to the tubular stator;
    a sleeve located at least partly inside the tubular rotor, said sleeve including
        a first end ring configured to connect to a supporting frame of a wind power turbine,
        a second end ring smaller than the first end ring and configured to house the bearing, and
        a connecting portion connecting the first end ring and the second end ring, said connecting portion including a plurality of arms between the first end ring and the second end ring; and
    a bearing located inside and fixed to the sleeve, and which supports a rotation of the tubular rotor with respect to the sleeve.

23. The electric power generating wind power turbine rotary electric machine of claim 22, wherein the sleeve is formed in one piece.

24. The electric power generating wind power turbine rotary electric machine of claim 23, wherein the sleeve is cast in one piece.

25. An electric power generating wind power turbine rotary electric machine comprising:
    a tubular stator including a plurality of stator segments, said tubular stator including:
        a tubular stator member configured to support the plurality of stator segments along an inner face, and
        a plurality of arms;
    a tubular rotor including a plurality of rotor segments, said tubular rotor being located inside the tubular stator and configured to rotate about an axis of rotation with respect to the tubular stator;
    a sleeve located at least partly inside the tubular rotor, said sleeve including:
        a first end ring configured to connect to a supporting frame of a wind power turbine,
        a second end ring smaller than the first end ring and configured to house the bearing, and
        a connecting portion connecting the first end ring and the second end ring,
        wherein the tubular stator is fitted to and projects from the sleeve and the plurality of arms of the tubular stator are arranged about the first end ring to connect one end of the tubular stator member to the sleeve;

a bearing located inside and fixed to the sleeve, and which supports a rotation of the tubular rotor with respect to the sleeve.

26. The electric power generating wind power turbine rotary electric machine of claim 25, wherein each two adjacent arms of the plurality of arms are spaced apart to define an opening by which to extract and insert at least one of: the plurality of stator segments and the plurality of rotor segments.

27. An electric power generating wind power turbine rotary electric machine comprising:
a tubular stator including a plurality of stator segments;
a tubular rotor including a plurality of rotor segments, said tubular rotor being located inside the tubular stator and configured to rotate about an axis of rotation with respect to the tubular stator;
a sleeve located at least partly inside the tubular rotor and connectable to a supporting frame of a wind power turbine, wherein the sleeve and the tubular rotor are connectable by an actuating device configured to rotate the tubular rotor about the axis of rotation with respect to the sleeve; and
a bearing located inside and fixed to the sleeve, and which supports a rotation of the tubular rotor with respect to the sleeve.

28. An electric power generating wind power turbine rotary electric machine sleeve comprising:
a first end ring configured to connect to a supporting frame of a wind power turbine having: (a) a tubular stator including a plurality of stator segments, and (b) a tubular rotor including a plurality of rotor segments, said tubular rotor being located inside the tubular stator and configured to rotate about an axis of rotation with respect to the tubular stator;
a second end ring smaller than the first end ring and configured to house a bearing of the wind power turbine; and
a connecting portion connecting the first end ring and the second end ring, said connecting portion including a plurality of arms between the first end ring and the second end ring.

29. The electric power generating wind power turbine rotary electric machine sleeve of claim 28, wherein the sleeve is formed in one piece.

30. An electric energy producing wind power turbine comprising:
a nacelle and configured to rotate about a first axis;
a blade assembly configured to rotate with respect to the nacelle about a second axis; and
a rotary electric machine fitted to the nacelle and configured to produce electric energy, said rotary electric machine including:
a tubular stator including a plurality of stator segments;
a tubular rotor including a plurality of rotor segments, said tubular rotor being located inside the tubular stator and configured to rotate about the second axis with respect to the tubular stator;
a sleeve located at least partly inside the tubular rotor, said sleeve including:
a first end ring configured to connect to the nacelle,
a second end ring smaller than the first end ring and configured to house the bearing, and
a connecting portion connecting the first end ring and the second end ring, said connecting portion including a plurality of arms between the first end ring and the second end ring; and
a bearing located inside and fixed to the sleeve, and which supports a rotation of the tubular rotor with respect to the sleeve.

31. An electric energy producing wind power turbine comprising:
a nacelle and configured to rotate about a first axis;
a blade assembly configured to rotate with respect to the nacelle about a second axis; and
a rotary electric machine fitted to the nacelle and configured to produce electric energy, said rotary electric machine including:
a tubular stator including a plurality of stator segments, said tubular stator including:
a tubular stator member configured to support the plurality of stator segments along an inner face, and
a plurality of arms;
a tubular rotor including a plurality of rotor segments, said tubular rotor being located inside the tubular stator and configured to rotate about the second axis with respect to the tubular stator;
a sleeve located at least partly inside the tubular rotor, said sleeve including:
a first end ring configured to connect to the nacelle,
a second end ring smaller than the first end ring and configured to house the bearing, and
a connecting portion connecting the first end ring and the second end ring,
wherein the tubular stator is fitted to and projects from the sleeve and the plurality of arms of the tubular stator are arranged about the first end ring to connect one end of the tubular stator member to the sleeve; and
a bearing located inside and fixed to the sleeve, and which supports a rotation of the tubular rotor with respect to the sleeve.

32. The electric energy producing wind power turbine of claim 31, wherein each two adjacent arms of the plurality of arms are spaced apart to define an opening by which to extract and insert at least one of: the plurality of stator segments and the plurality of rotor segments.

33. An electric energy producing wind power turbine comprising:
a nacelle and configured to rotate about a first axis;
a blade assembly configured to rotate with respect to the nacelle about a second axis; and
a rotary electric machine fitted to the nacelle and configured to produce electric energy, said rotary electric machine including:
a tubular stator including a plurality of stator segments;
a tubular rotor including a plurality of rotor segments, said tubular rotor being located inside the tubular stator and configured to rotate about the second axis with respect to the tubular stator;
a sleeve located at least partly inside the tubular rotor and connectable to the nacelle, wherein the sleeve and the tubular rotor are connectable by an actuating device configured to rotate the tubular rotor about the second axis with respect to the sleeve; and
a bearing located inside and fixed to the sleeve, and which supports a rotation of the tubular rotor with respect to the sleeve.

* * * * *